Dec. 17, 1946.    J. BOLSEY    2,412,559

SHUTTER ACTUATING MECHANISM

Filed Jan. 27, 1944    5 Sheets-Sheet 1

INVENTOR:
JACQUES BOLSEY

Dec. 17, 1946.   J. BOLSEY   2,412,559
SHUTTER ACTUATING MECHANISM
Filed Jan. 27, 1944   5 Sheets-Sheet 4

Fig. 7.

INVENTOR.
Jacques Bolsey
BY

Patented Dec. 17, 1946

2,412,559

UNITED STATES PATENT OFFICE 2,412,559

SHUTTER ACTUATING MECHANISM

Jacques Bolsey, New York, N. Y.

Application January 27, 1944, Serial No. 519,902

14 Claims. (Cl. 95—55)

My present invention relates to shutter actuating mechanisms and more particularly to mechanisms for operating so called sliding reciprocating shutters.

It is an object of my present invention to provide a shutter mechanism which is extremely simple in construction, easy to operate and reliable in use.

It is a further object of my present invention to provide a shutter mechanism which is controlled by one single setting knob.

It is still a further object of my present invention to provide a shutter mechanism which is very compact and can be removed as a single unit from the camera body for examination and repairs, if necessary.

With the above objects in view, my present invention mainly consists of a shutter actuating mechanism comprising a manually operated setting member for setting the various longer and shorter exposure times, spring means for moving the shutter blade past the exposure aperture of the camera, means controlled by the setting member for varying the tension of the above-mentioned spring means so as to increase the spring tension when the exposure time has to be shortened, and delayed action means for reducing, at least during the longer exposure times, the speed of the shutter blade while the same is moved by the spring means past the exposure aperture. The spring members used for the purposes of the present invention is preferably a relatively long coiled spring and the delayed action means preferably comprise a gear member and braking means engaging the teeth of this gear member.

As set forth above, preferably the length of the shorter exposure times is controlled exclusively by the tension of this coiled spring while the length of the longer exposure times is controlled by the number of teeth engaging the braking means delaying turning of the delaying gear member. Thus, the length of the shorter exposure times is varied by the setting member, e. g. setting knob, by variation of the tension of the coiled spring while the length of the longer exposure times is varied by change of the number of teeth of the toothed gear member engaging the braking means. In accordance with the present invention all these variations are carried out exclusively by turning of a single setting knob.

My present invention furthermore comprises the provision of means for enabling bulb and time exposures which are controlled by the same setting knob. For this purpose, the shutter blade actuating mechanism also comprises means for moving the shutter blade past the exposure aperture of the camera against action of the coiled shutter spring mentioned above, means for holding this shutter blade in its wound-up position and to release the same for operative movement past the exposure aperture, and movable blocking means adapted to be moved into the path of the shutter blade so as to hold the same in operative position with the shutter aperture in register with the exposure aperture of the camera; in accordance with my present invention, these blocking means are movably, preferably turnably, secured to the camera body; furthermore, I provide means operatively connecting the setting member described above with this movable supporting member in such a manner as to enable movement of the blocking means movably carried by this supporting member into such a position as to be adapted to be moved by the releasing means mentioned above into the path of the shutter blade when the same is released by movement of these releasing means. Thus, movement of the releasing means simultaneously releases the shutter blade for operative exposing movement and moves the blocking means into the path of this shutter blade so that the shutter blade is held in exposing position with the shutter aperture superimposed upon the exposure aperture of the camera; when said releasing means then are allowed to return to their initial position, the blocking means move out of the path of the shutter blade and the same moves on, closing the exposure aperture. Thus, by regulating the length of time of operation of the releasing means, it is possible to regulate the length of bulb exposures. Time exposures are also obtained in similar manner which will be described below in detail.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

The entire shutter mechanism is mounted into a front compartment of the camera which is formed by the compartment front wall 10, the top wall 11 and the bottom wall 12; both walls 11 and 12 are secured to front wall 10. These three walls carry the entire shutter actuating mechanism and simultaneously form the front part of the camera, not shown in the drawings. They are secured to the camera body by screws entering screw holes 13, 14, 15 and 16 in the top wall 11 and bottom wall 12, respectively, and can be removed together with the shutter mechanism as a separate unit, whenever required.

The main part of the entire shutter mechanism is the shutter blade 17 guided in grooves 18 and 19 provided in the top and bottom walls 11 and 12, respectively. This shutter blade 17 is provided with a shutter aperture 20 shown in Figure 1 in dotted lines. The guiding grooves 18 and 19 extend all over the length of top and bottom walls 11 and 12 thereby enabling sliding of the shutter blade in direction of arrow 63 along the entire length of these walls from one side of the exposure aperture 21 of the camera to the other side thereof and back.

A second obturation shutter 22 is also provided, closing the shutter aperture 20 during movement of the shutter blade 17 against direction of arrow 63 past the exposure aperture 21, while this shutter blade 17 is slid into the so-called initial wound-up position ready for exposure. The obturation shutter 22 is also provided with an aperture 23 corresponding in size to the exposure aperture 21 and designated in Figure 1 with the same outline as the latter.

It should be mentioned that front wall 10 is also provided with an aperture 24 in front of exposure aperture 21 so as to enable light to reach the lens within the camera body through the superimposed apertures 21 and 23 when shutter blade 17 and obturation shutter 22 are in operative position.

Figure 1:
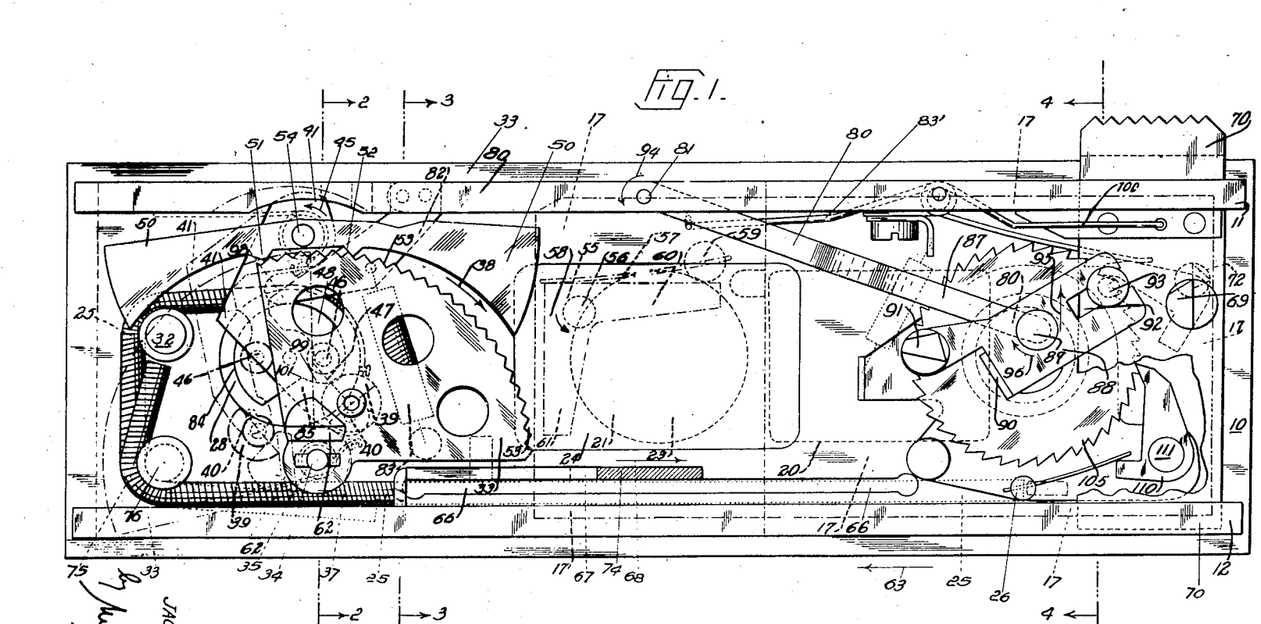
Figure 1 is a rear view of the entire shutter mechanism, with the shutter blade and obturation blade shown in dotted lines.
Figure 4:
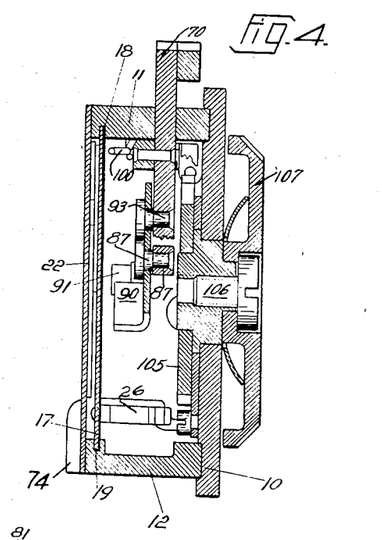
Figure 4 is a cross section through the same shutter mechanism, along line 4—4 of Fig. 1.
Figure 6:
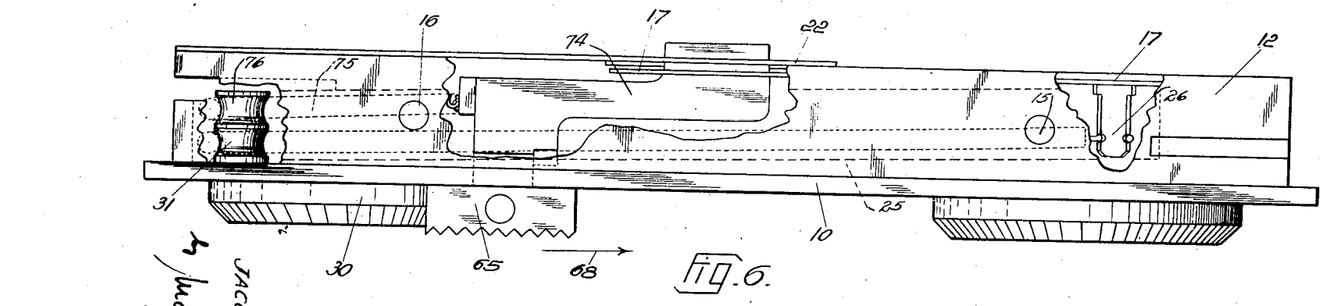
Figure 6 is a top view of the same shutter mechanism.
Figure 7:
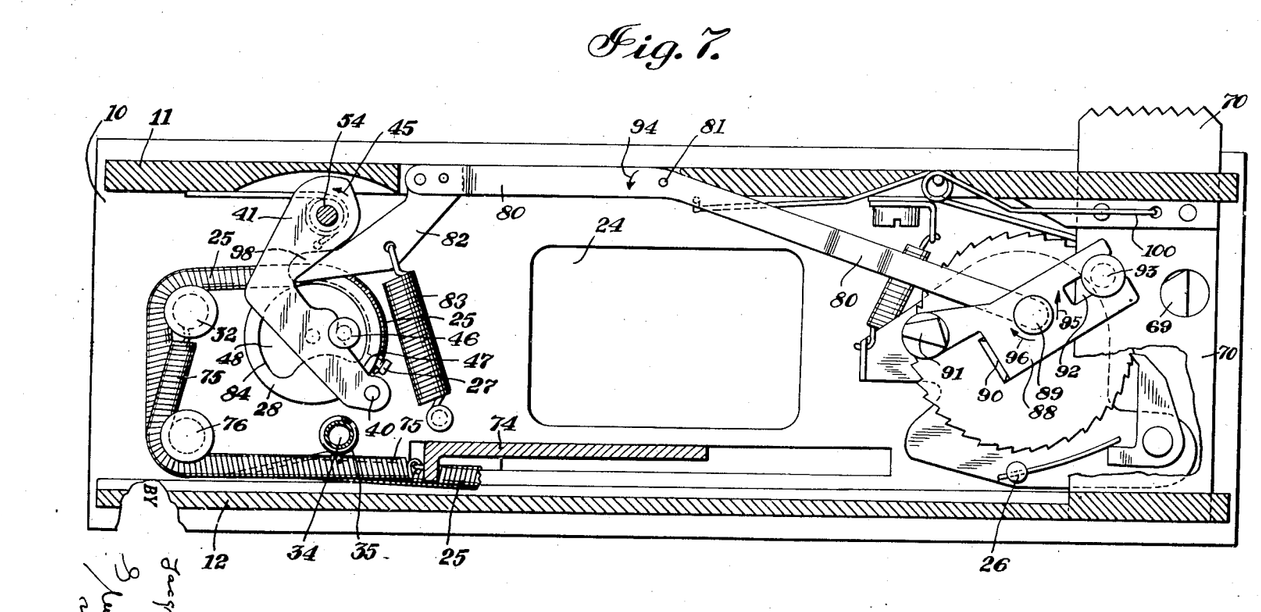
Fig. 7 is a vertical section through the shutter mechanism, along line 7—7 of Fig. 2.
Figures 8, 9:
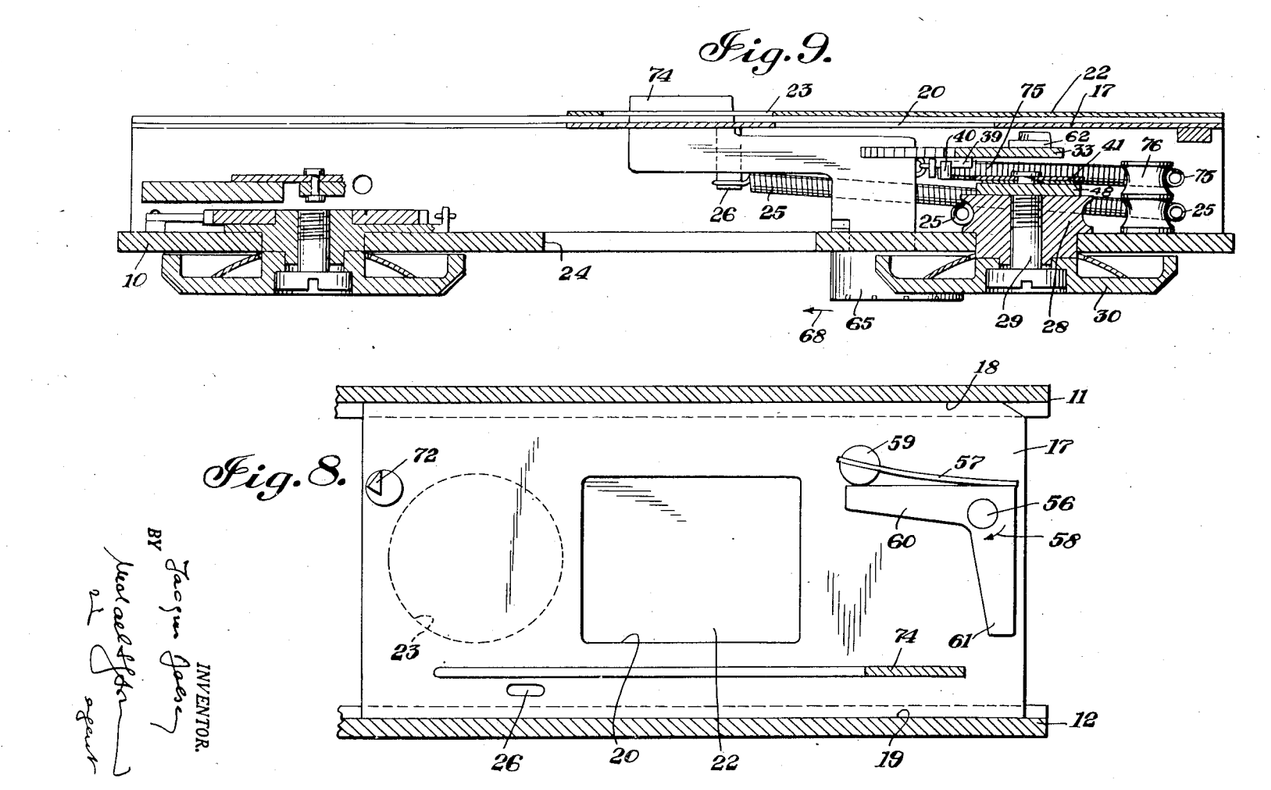
Fig. 8 is a partial vertical section through the shutter mechanism, along line 8—8 of Fig. 2.
Fig. 9 is a horizontal section along line 9—9 of Fig. 2.

The main means for moving the shutter blade 17 during exposure is the coiled spring 25 secured at its one end to pin 26 secured to the shutter blade 17 as shown in Figures 1 and 4 and secured at its other end by pin 27 to pulley 28 connected by screw 29 with setting knob 30, which latter is rotatably journalled in front wall 10. Thus, by turning the setting knob 30 the length of the coiled spring 25 is varied and its tension decreased or increased according to the direction of turning of knob 30. Since during elongation of spring 25 part of the same is wound up on pulley 28, the active length of this spring is simultaneously decreased, thereby additionally increasing the spring tension. In order to increase the length of spring 25, the same is guided over the two guiding rollers 31 and 32 as shown in Figures 1 and 6.

It is evident that such a coiled spring 25 is only adapted for obtaining the shorter exposure times since the shutter speed caused by such a spring is considerable. Thus, it is possible to vary the tension of spring 25 by means of setting knob 30 within such limits as to obtain exposure times varying between $1/100$ and $1/1000$ of a second. For obtaining longer exposure times, i. e. in order to decrease the shutter speed, I have to provide separate delayed action means combined with the coiled spring 25.

Figure 2:
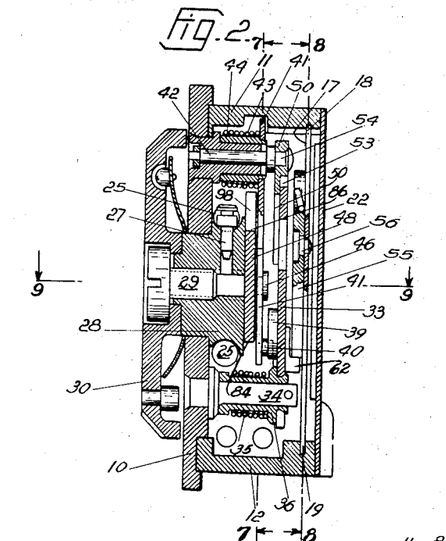
Figure 2 is a cross section through the shutter mechanism shown in Figure 1, along line 2—2 of Figure 1.

These delayed action means comprise mainly a toothed gear segment 33 turnably pivoted to front wall 10 by means of pivot 34 as clearly shown in Figure 2. The torsional spring 35 is wound upon the sleeve member 36 which latter is attached to the toothed gear segment 33; this spring 35 is secured at its one end to this sleeve member 36 and at its other end at 37 to the front wall 10, urging segment 33 to turn about pivot 34 in direction of arrow 38. Thus, whenever segment 33 is turned against direction of arrow 38 and then released, it automatically returns into its initial position shown in Figure 1.

In order to adjust the length of exposure times it is necessary to regulate this initial position of gear segment 33. This is done by providing on the rear face of segment 33 a semi-circular projection 39 engaging pin 40 secured to lever 41 as shown in Figures 1 and 2. This lever 41 is turnably secured to front wall 10 by means of pivot 42 urged in direction of arrow 45 by means of torsional spring 43 wound upon sleeve 44, and turned about pivot 42 by pin 46 engaging edge 47 of this lever against direction of arrow 45, whenever pin 46 is moved against this lever edge 47. This pin 46 is secured rigidly connected with setting knob 30 by means of the intermediate cam member 48 serving also for other purposes described below in detail, and screw 29 to which the latter member 48 is secured. Thus, it is possible to turn pin 46 about the pivoting axis of setting knob 30 by turning this setting knob.

This turning movement of pin 46 will result in pressure of pin 46 against edge 47 of lever arm 41, turning the same against direction of arrow 45. This movement of lever arm 41 will result in pressure of pin 40 against projection 39 on segment 33, turning this segment about pivot 34 against direction of arrow 38. Thus, it is possible to turn the toothed gear segment 33 about its pivot 34 against direction of arrow 38 by turning knob 30 and to vary the so-called initial position of this toothed gear segment. The thus obtained initial position of the toothed gear segment will be the one into which it will always tend to return by action of spring 35 if turned against direction of arrow 38. It is evident that when pin 46 is turned by setting knob 30 in such a direction as to decrease its pressure against lever arm 41, the same will be turned by the torsional spring 43 together with pin 40 secured to it in direction of arrow 45, thus following this pin and enabling the toothed gear segment 33 to turn in direction of arrow 38.

A further element of the delaying action means used in the mechanism is a pawl 50 engaging with its projections 51 and 52 the teeth 53 of the toothed gear segment 33 in the way shown in Figure 1. This pawl 50 is freely turnably secured to pivot 42 by pin 54. It is evident that a pawl of this type will brake the speed of turning of the toothed gear segment 33 when the same is turning about its pivot 34 in either direction.

Figure 3:
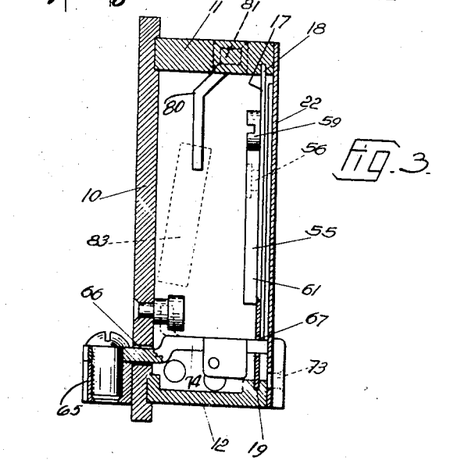
Figure 3 is a cross section through the same shutter mechanism, along line 3—3 of Figure 1.

In order to obtain influence of the above described delayed action means on the movement of the shutter blade, I provide on the shutter blade 17 the double-armed operating lever 55 shown in Figures 1 and 3. This operating lever is freely turnably pivoted to the shutter blade 17 by means of pivot 56 and urged by leaf spring 57 to turn in direction of arrow 58. Such turning movement of the double-armed lever 55 is limited by pivot 59 of leaf spring 57 against which the lever arm 60 of the double-armed lever 55 is pressed by the leaf spring 57. Thus, the other lever arm 61 of the double-armed lever 55 cannot move further in direction of arrow 58 than shown in Figure 1 but it can turn about pivot 56 against direction of arrow 58 if forced to do so. If released after such turning movement against direction of arrow 58, this lever arm 61 returns into its initial position, shown in Figure 1, by action of leaf spring 57.

The last element necessary to obtain the required co-operation between this operating double-armed lever 55 on shutter blade 17 and the toothed gear member 33 is a projection 62 on this gear segment arranged in such a manner as to be in the path of lever arm 61 of the double-armed lever 55 when the shutter blade 17 carrying lever 55 is moving in direction of arrow 63 during exposure.

The above described means for setting the exposure time operate as follows:

1. When short exposure times are required, the setting knob 30 is turned so as to turn by means of pin 46 the lever 41 against direction of arrow 45 into such a position that this lever 41 on its part turns by means of pin 40 and projection 39 the toothed gear segment 33 against direction of arrow 38 into the end position shown in Figure 1 in dotted lines. In this end position, projection 62 on gear member 33 is outside of the path of lever arm 61 and thus sliding of the shutter blade 17 is not influenced by the gear segment 33 forming part of the delayed action means. After this end position of the toothed gear segment 33 is reached, tension of the coiled spring 25 is adjusted by turning setting knob 30 as required, i. e. the tension of spring 25 is increased if very short and decreased if so called short exposure times are desired. In this way, exposure times between 1/100 and 1/1000 of a second may be obtained.

2. If longer exposure times are required, the setting knob 30 is moved so that the toothed gear segment 33 is turned in direction of arrow 38, thereby moving projection 62 secured to segment 33 into the path of lever arm 61 of the operating double-armed lever 55 secured to shutter blade 17.

Now, it is evident that if for instance segment 33 is in its position shown in Figure 1 in full lines, the lever arm 61 which is secured to shutter blade 17, as explained above, will strike the projection 62 during its operative movement in direction of arrow 63. Since shutter blade 17 is moving in direction of arrow 63 by action of coiled spring 25 which is substantially stronger than the torsional spring 35 turning segment 33 in direction of arrow 38, the lever arm 61 will push, by action of spring 25, the projection 62 against action of spring 35 in direction of arrow 63, thereby turning gear segment 33 against direction of arrow 38.

This turning movement, however, is braked by pawl 50, limiting the speed of the same. Thus, it will take a certain time until segment 33 moves from its initial position shown in full lines into its end position, shown in Figure 1 in dotted lines. During this time, the shutter will move only a very short distance. Since the shutter opening 20 is larger than the exposure aperture 21 and lever 55 is arranged in such a manner that lever arm 61 strikes against projection 62 at that moment when shutter opening 20 is in front of exposure aperture 21, this exposure aperture will be open and exposure will continue during the entire period needed for movement of segment 33 from its initial into its final position. Thus, this segment and the pawl 50 connected with it will result in extension of the exposure time, making longer exposures possible.

Everybody skilled in this art will easily understand that by reducing the number of those teeth of segment 33 which engage pawl 50 during its movement from initial into final position it is possible to vary the period of time during which movement of shutter blade 17 is delayed, i. e. the time during which shutter aperture 20 is in front of exposure aperture 21. Thus, it is possible to vary the length of the longer exposure times by varying the initial position of gear segment 33. This will result in variation of the number of gear teeth 53 engaged by pawl 50 during turning of gear segment 33 from the thus obtained different initial positions into its end position.

Such adjustment of the initial position of gear segment 33 can easily be attained by the adjusting means described above, namely by means of pin 46, lever 41, pin 40, and projection 39: Thus, by turning setting knob 30 in an appropriate way, it is possible to turn pin 46 about pivot 29 as explained above, thus pressing this pin against the edge 47 of lever 41, thereby pushing pin 40 against projection 39 and turning segment 33 to which this projection is secured against direction of arrow 38. Since it is possible to turn pin 46 by means of setting knob 30 in such a manner as to obtain any desired position of gear segment 33 between the positions shown in full lines and that shown in dotted lines, it is also possible to adjust, by means of this setting knob, the longer exposure times of shutter blade 17 within wide limits, i. e. within the very long exposure time obtained by the delaying movement of segment 33 from its initial position shown in full lines into its end position shown in dotted lines and the practically undelayed exposure time of the shutter obtained if segment 33 is turned into an initial position near its end position, shown in Figure 1 in dotted lines already before start of the movement of the shutter.

Figure 5:
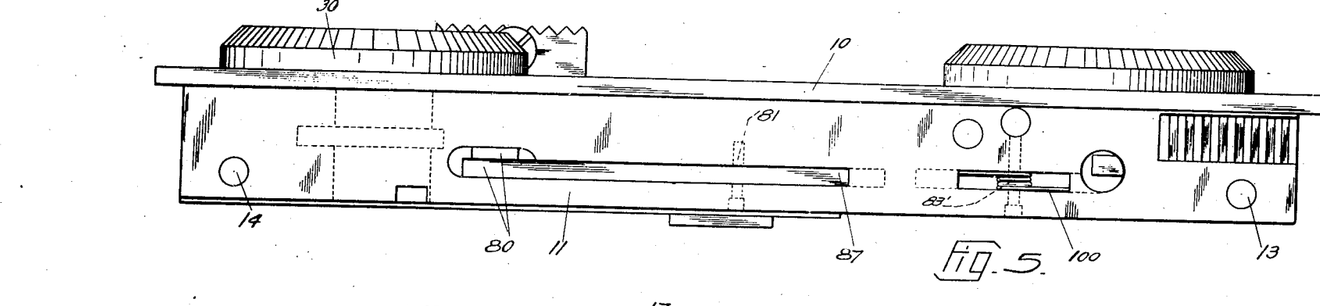
Figure 5 is a bottom view partly in section of the shutter mechanism shown in Figure 1.

I wish to mention that for arming the shutter spring, i. e. for moving the shutter blade 17 into its initial position shown in Figure 1 in dotted lines, I use knob 65 and connecting member 74 passing through slot 66 in front wall 10 and slot 67 in the shutter blade 17. If this knob is moved in direction of arrow 68 as shown in Figure 5, the shutter blade 17 is moved into its initial position shown in Figure 1 stressing thereby spring 25 and increasing its tension. In this initial position, the shutter blade 17 is held by projection 69 on releasing member 70. This pin 69 is adapted to engage pin 72 secured to shutter blade 17, holding the same in its initial position.

I wish also to mention that the obturation shutter 22 is arranged parallel to shutter blade 17 and firmly connected by means of screw 73 to connecting member 74 which latter, as explained above, passes through slot 66 in front wall 10 and slot 67 in shutter blade 17. This obturation shutter 22 is provided with a separate coiled spring 75 passing over guiding roller 16 and pulling it back into its initial position at the left side of the exposure aperture 21 as shown in Figure 1.

In order to obtain also bulb and time exposures, i. e. in order to make it possible to expose for half a second or longer, I have to provide additional means to prevent movement of the shutter blade while the shutter aperture is in front of the exposure aperture of the camera.

For this purpose I use lever 80 which is turnably pivoted to the top wall 11 by means of pivot 81 in the way shown in Figures 1 and 3. The tip 98 of lever arm 82 of this lever 80 is permanently pressed against the peripheral face 84 of the cam-like member 48 by means of springs 83 and 83'. This cam-like member 48 is provided with a recess 85 for the purposes described below. In the position shown in Figure 1, tip 98 of lever arm 82 of the lever 80 presses against the annular portion 86 of the peripheral face 84 of the cam-like member 48 and is thus held by this member 48 in a position enabling regulation of the length of exposure time by the means described above in detail.

Lever 80 is provided besides lever arm 82 also with lever arm 87, carrying at its end freely turnably mounted the blocking member 88 which is secured to it by means of pivot 89, as shown in Figure 1. This blocking member 88 is provided with two catch projections 90 and 91 shaped and arranged as shown and also provided with slot 92, engaging pin 93 arranged on releasing member 70.

It is evident that by turning lever 80 about its pivoting point 81 in direction of arrow 94, it is possible to lift pivot 89 and blocking member 88 held by it. Such movement of pivot 89 in direction of arrow 95 will result also in turning of blocking member 88 about this pivot 89 in direction of arrow 96: this turning movement is caused by pin 93 which is stationary and sliding in slot 92 forces blocking member 88 to turn about pivot 89. This combined turning and raising of the blocking member 88 will also result in a similar movement of the catch projections 90 and 91, so that the same will move in direction of arrow 95.

The extent of such movement of the catch projections 90 and 91 will depend on the extent of turning of lever 80 about pivot 81: if this lever is turned only slightly, it is possible to turn blocking member 88 in such a way that catch projection 91 is in the path of pin 72 on the shutter blade 17 if the releasing member 70 is pushed downward. I wish to stress that if such effect is required, the blocking member 88 should not be turned so far that catch projection 91 is in the path of projection 72 on shutter blade 17 already before downward movement of the releasing member 70. If this were the case, pushing down of the releasing member 70 during releasing of shutter blade 17 would still further lift catch projection 91 by turning blocking member 88 about pivot 89 and thus move this catch projection 91 out of and over the path of projection 72 on shutter blade 17. Thus, it is necessary for the purposes of the present invention to turn blocking member 88 into a position in which catch projection 91 is slightly below the level of projection 72 on shutter blade 17 if it is desired that during release of this shutter blade this projection 91 is in the path of the projection 72 on the shutter blade 17.

Similarly, it is possible to lift also catch projection 90 into the path of projection 72 on shutter blade 17. However, also in this case it is necessary to limit movement of the pivot 89 of blocking member 88 in such a manner that the catch projection 90 is slightly below the level of projection 72 on shutter blade 17; thus, if the shutter blade is released by pushing down the releasing member 70, the catch projection 90 is turned exactly into the path of the projection 72 on the shutter blade 17.

The above described means for obtaining bulb and time exposures of desired length are operated as follows:

1. If it is required to keep the exposure aperture open while the releasing member 70 is pressed downward, i. e. to make a bulb exposure, it is necessary to turn lever 80 in such a manner that catch projection 91 is slightly under the path of projection 72 on shutter blade 17 as explained above. This position of lever 80 can be obtained by suitable adjustment of the position of the cam-like member 48 by means of the setting member 30 to which it is secured.

If the setting member is turned in clockwise direction, such a turning movement will cause turning of the cam-like member 48 about its axis in the same direction, and the same will face the tip 98 of lever arm 82 with its recessed portion 85. This will result in turning of lever 80 about its pivoting point 81 by action of spring 83. Now, if setting member 30 is adjusted in such a manner that tip 98 of lever arm 82 contacts the middle portion 99 of the receding peripheral face 84 of the cam-like member 48, the lever arm 80 will be in such a position that blocking member 88 is somewhat lifted with catch projection 91 slightly under the path of projection 71 on shutter blade 17.

If, after adjusting the blocking member 88 in this way, shutter blade 17 is moved into its initial position shown in Figure 1 and then released by pushing down the releasing member 70, projection 72 on the shutter blade 17 will strike against the catch projection 90 which has been lifted by the pushing down movement of releasing member 70 into the path of projection 72. Thus, this catch projection 91 will block further movement of projection 72 on shutter blade 17 and hold the latter in operative position with its shutter aperture 20 in front of the exposure aperture 21 of the camera. After the shutter has been held in this operative position for the required length of time, the releasing member 70 is allowed to return into its initial position by action of spring 100. As evident from above explanation this return movement of the releasing member 70 will result in a turning movement of blocking member 88 about pivot 89 in direction of arrow 95 which in turn will cause movement of catch projection 91 downward out of the path of projection 72 on shutter blade 17; the thus released shutter blade 17 will continue in its sliding movement and close the exposure aperture 21 of the camera.

2. If it is required to make a time exposure, i. e. if it is desired to open the exposure aperture 21 by pushing down the releasing member 70 and to close the exposure aperture 21 only when the releasing lever 70 is pushed down a second time, it is necessary to turn setting member 30 in such a position that the cam-like member 48 contacts tip 98 of lever arm 82 with the deepest part 101 of recess 85, thereby enabling lever arm 80 to turn by action of spring 83 still further in direction of arrow 94, causing further lifting of pivot 89 in direction of arrow 95. In this way, it is possible to move blocking member 88 into such a position that when releasing member 70 is pushed downward, this blocking member 88 is turned about pivot 89 into such a position that projection 72 on shutter blade 17 strikes during its movement in direction of arrow 63 against catch projection 90 on this blocking member, preventing further movement of the shutter blade.

When the releasing member 70 is allowed to return into its initial position, blocking member 88 will turn, as explained above, in direction of arrow 95 and projection 72 on shutter blade 17 will become disengaged from catch projection 90 and the shutter blade 17 continue in its operative sliding movement in direction of arrow 63. However, the two catch projections 90 and 91 are arranged relative to each other in such a manner that when catch projection 90 returns by release of releasing member 70 into its initial position, catch projection 91 turns downward into the path of projection 72 on shutter blade 17, thus preventing further movement of the same and keeping the exposure aperture open, as explained above.

Thus, it is possible to move blocking member 88 into such a position that by pushing down and releasing of releasing member 70, the shutter blade 17 is moved into operative position and held in that position by catch projection 91. In order to release the shutter blade 17 after the required length of exposure time, it is only necessary to push down the releasing member 70 again, thereby moving catch projection 91 out of the path of projection 72 and enabling shutter blade 17 to continue its operative movement under action of shutter spring 25.

The above described arrangement makes it possible to obtain the most different shutter speeds and exposure times in an extremely simple way by means of a mechanism containing very few parts co-operating with each other in a very reliable manner.

It is evident that the above described shutter mechanism might be combined with a counting mechanism for counting the exposures in a way known to everybody skilled in the art, for instance by arranging such a counting mechanism in the path of the shutter blade 17 or another part of the mechanism carrying out a predetermined movement during each to and fro movement of the shutter blade. A counting mechanism of this type is shown in the drawings. This counting mechanism consists of a ratchet wheel 105 arranged so as to turn each time the shutter is moved. With this ratchet wheel 105 a shaft 106 is connected which carries on its other end the indicating dial 107. In order to prevent turning of ratchet wheel 105 in undesired direction, I provide the pawl member 110 which is pivoted by means of pivot 111 to the housing and engages the teeth of the ratchet wheel 105 as shown. Since the film is transported at the same time when the shutter is armed, each shutter movement is a clear indication for the number of film exposures. I wish to stress that this counting mechanism does not form part of the invention claimed by me in the appended claims.

It will be understood that each of the elements described above, or two or more together, may also find a useful application in other types of shutter mechanisms differing from the types described above.

While I have illustrated and described the invention as embodied in so-called sliding reciprocating shutter mechanisms, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. In a shutter blade actuating mechanism, a shutter blade having a shutter aperture, a manually turnable setting knob for setting the various longer and shorter exposure times for said shutter blade, a turnable winding drum secured coaxially to said setting knob and operated by the same, a coiled spring for moving said shutter blade past the exposure aperture of a camera, said coiled spring being attached at its one end to said shutter blade and at its other end to said winding drum and wound up partly upon the same when said winding member is turned by said setting knob in such a manner as to stretch said coiled spring and increase the tension of the same when said exposure time has to be shortened, delayed action means for reducing during said longer exposure times the speed of said shutter blade while the same is moved by said coiled spring past said exposure aperture, means for varying the delaying action of said delayed action means as necessary for obtaining the required longer exposure time, and means for cooperatively connecting said means for varying the delaying action with said setting knob so as to enable operation of said varying means and said delayed action means influenced by the latter in such a manner as to obtain during said longer exposure times the required speed reducing action of said delayed action means.

2. In a shutter blade actuating mechanism of the type described, a shutter blade having a shutter aperture, a manually operable setting member for setting the various longer and shorter exposure times for said shutter blade, a turnable winding member operated at least during setting of said various shorter exposure periods by said setting member, a coiled spring for moving said shutter blade past the exposure aperture of a camera, said coiled spring being attached at its one end to said shutter blade and at its other end to said winding member and wound up partly upon the same when said winding member is turned by said setting member in such a manner as to stretch said coiled spring, said winding member thus increasing the tension of said coiled spring at least during said various shorter exposure times by stretching the same when said exposure time has to be shortened, and delayed action means for reducing the speed of said shutter blade while the shutter aperture in said shutter blade is in register with said exposure aperture of said camera, said delayed action means comprising a turnable toothed member, a braking mechanism adapted to engage the teeth of said toothed member and to limit the speed of turning of the latter, means operatively connecting said toothed member with said shutter blade while the same is moved by said coiled spring past said exposure aperture of said camera and said shutter aperture in said shutter blade is in register with said exposure aperture, and means operated by said setting member for turning said toothed member during setting of said various longer exposure times and thereby varying the number of teeth of said toothed member engaging during turning of the same said braking mechanism and varying also simultaneously the time of speed limitation of said toothed member, thus enabling variation of the length of time of speed reduction of said toothed member and of said shutter blade operatively connected with said toothed member during said longer exposure times of said shutter blade.

3. In a shutter blade actuating mechanism, a shutter blade having a shutter aperture, a manually turnable setting knob for setting the various longer and shorter exposure times for said shutter blade, a turnable winding drum mounted coaxially with said setting knob and operated at least during setting of said various shorter exposure times by the same, a coiled spring for moving said shutter blade past the exposure aperture of a camera, said coiled spring being attached at its one end to said shutter blade and at its other end to said winding drum and wound up partly upon the same when said winding member is turned by said setting knob in such a manner as to stretch said coiled spring and increase the tension of the same when said exposure time has to be shortened during said various shorter exposure times, and delayed action means for reducing the speed of said shutter blade while during said longer exposure times the shutter aperture on said shutter blade is in register with said exposure aperture of said camera, said delayed action means comprising a turnable toothed member, a braking mechanism adapted to engage the teeth of said toothed member and to limit the speed of turning of the latter, means operatively connecting said toothed member with said shutter blade while the same is moved by said coiled spring past said exposure aperture of said camera and said shutter aperture in said shutter blade is in register with said exposure aperture, and means operatively connected with said turnable setting knob for turning during setting of said longer exposure times of said shutter blade said toothed member and thereby varying the number of teeth of said toothed member engaging during turning of the same said braking mechanism and varying also simultaneously the time of speed limitation of said toothed member, thus enabling variation of the length of time of speed reduction of said toothed member and of said shutter blade operatively connected with said toothed member during said longer exposure times of said shutter blade.

4. In a shutter blade actuating mechanism, a shutter blade having a shutter aperture, a manually turnable setting knob for setting the various longer and shorter exposure times for said shutter blade, a turnable winding drum mounted coaxially with said setting knob and operated at least during setting of said various shorter exposure times by the same, a coiled spring for moving said shutter blade past the exposure aperture of a camera, said coiled spring being attached at its one end to said shutter blade and at its other end to said winding drum and wound up partly upon the same when said winding member is turned by said setting knob in such a manner as to stretch said coiled spring and increase the tension of the same when said exposure time has to be shortened during said various shorter exposure times, and delayed action means for reducing the speed of said shutter blade while during said longer exposure times the shutter aperture on said shutter blade is in register with said exposure aperture of said camera, said delayed action means comprising a turnable toothed member, a supporting member supporting said toothed member freely turnably between two end positions, spring means urging said toothed member into one of said end positions, a braking mechanism adapted to engage the teeth of the toothed member and to limit the speed of turning of the latter, means operatively connecting said toothed member with said shutter blade while the same is moved by said shutter blade moving means past said exposure aperture of said camera and said shutter aperture in said shutter blade is in register with said exposure aperture of said camera, and means operatively connected with said turnable setting knob for turning during setting of said longer exposure times of said shutter blade said supporting member and said toothed member carried by the same and thereby varying the number of teeth of said toothed member engaging during turning of the same said braking mechanism and varying also simultaneously the time of speed limitation of said toothed member, thus enabling variation of the length of time of speed reduction of said toothed member and of said shutter blade operatively connected with said toothed member during said longer exposure times of said shutter blade.

5. In a shutter blade actuating mechanism of the type described, a shutter blade, a manually operable setting member for setting the various longer and shorter exposure periods and the so-called time exposure for said shutter blade, a turnable winding member operated at least during setting of said various shorter exposure periods by said setting member, a coiled spring for moving said shutter blade past the exposure aperture of a camera, said coiled spring being attached at its one end to said shutter blade and at its other end to said winding member and wound up partly upon the same when said winding member is turned by said setting member in such a manner as to stretch said coiled spring at least during said various shorter exposure periods by stretching the same when said exposure period has to be shortened, delayed action means for reducing the speed of said shutter blade while the shutter aperture in said shutter blade is in register with said exposure aperture of said camera, said delayed action means comprising a turnable toothed member, a braking mechanism adapted to engage the teeth of said toothed member and to limit the speed of turning of the latter, means operatively connecting said toothed member with said shutter blade while the same is moved by said coiled spring past said exposure aperture of said camera and said shutter aperture in said shutter blade is in register with said exposure aperture, and means operated by said setting member for turning said toothed member during setting of said various longer exposure periods and thereby varying the number of teeth of said toothed member engaging during turning of the same said braking mechanism and varying also simultaneously the time of speed limitation of said toothed member, thus enabling variation of the length of time of speed reduction of said toothed member and of said shutter blade operatively connected with said toothed member during said various longer exposure periods of said shutter blade, movable blocking means adapted to be moved into the path of said shutter blade so as to hold the same in operative position with said shutter aperture in register with said exposure aperture of said camera, and means operatively connecting said setting member with said movable blocking means so that said setting member moves said movable blocking means into operative position in the path of said shutter blade when said setting member is in time exposure setting position.

6. In a shutter blade actuating mechanism of the type described, a shutter blade, a manually operable setting member for setting the various longer and shorter exposure periods and the so-called time exposure for said shutter blade, a turnable winding member operated at least during setting of said various shorter exposure periods by said setting member, a coiled spring for moving said shutter blade past the exposure aperture of a camera, said coiled spring being attached at its one end to said shutter blade and at its other end to said winding member and wound up partly upon the same when said winding member is turned by said setting member in such a manner as to stretch said coiled spring at least during said various shorter exposure periods by stretching the same when said exposure period has to be shortened, delayed action means for reducing the speed of said shutter blade while the shutter aperture in said shutter blade is in register with said exposure aperture of said camera, said delayed action means comprising a turnable toothed member, a braking mechanism adapted to engage the teeth of said toothed member and to limit the speed of turning of the latter, means operatively connecting said toothed member with said shutter blade while the same is moved by said coiled spring past said exposure aperture of said camera and said shutter aperture in said shutter blade is in register with said exposure aperture, and means operated by said setting member for turning said toothed member during setting of said various longer exposure periods and thereby varying the number of teeth of said toothed member engaging during turning of the same said braking mechanism and varying also simultaneously the time of speed limitation of said toothed member, thus enabling variation of the length of time of speed reduction of said toothed member and of said shutter blade operatively connected with said toothed member during said various longer exposure periods of said shutter blade, movable blocking means adapted to be moved into the path of said shutter blade so as to hold the same in operative position with said shutter aperture in register with said exposure aperture of said camera, means operatively connecting said setting member with said movable blocking means so that said setting member moves said movable blocking means into operative position in the path of said shutter blade when said setting member is in time exposure setting position, means for releasing said shutter blade for operative exposing movement past said exposure aperture of said camera, and means operatively connected with said releasing means for moving said blocking means when the same have been moved by said setting member into operative position in the said path of said shutter blade out of this path of said shutter blade after the latter has been held by said blocking means for the desired length of exposure time in operative position with said shutter aperture in register with said exposure aperture.

7. In a shutter blade actuating mechanism, a shutter blade, a manually turnable setting knob for setting the various longer and shorter exposure periods and the so-called time exposure for said shutter blade, a turnable winding drum mounted co-axially with said setting knob and operated at least during setting of said various shorter exposure periods by the same, a coiled spring for moving said shutter blade past the exposure aperture of a camera, said coiled spring being attached at its one end to said shutter blade and at its other end to said winding drum and wound up partly upon the same when said winding member is turned by said setting knob in such a manner as to stretch said coiled spring and increase the tension of the same when said exposure period has to be shortened during said various shorter exposure periods, delayed action means for reducing the speed of said shutter blade while during said longer exposure periods the shutter aperture on said shutter blade is in register with said exposure aperture of said camera, said delayed action means comprising a turnable toothed member, a braking mechanism adapted to engage the teeth of said toothed member and to limit the speed of turning of the latter, means operatively connecting said toothed member with said shutter blade while the same is moved by said coiled spring past said exposure aperture of said camera and said shutter aperture in said shutter blade is in register with said exposure aperture, and means operatively connected with said turnable setting knob for turning during setting of said longer exposure periods of said shutter blade said toothed member and thereby varying the number of teeth of said toothed member engaging during turning of the same said braking mechanism and varying also simultaneously the time of speed limitation of said toothed member, thus enabling variation of the length of time of speed reduction of said toothed member and of said shutter blade operatively connected with said toothed member during said longer exposure periods of said shutter blade, movable blocking means adapted to be moved into the path of said shutter blade so as to hold the same in operative position with said shutter aperture in register with said exposure aperture of said camera, and means operatively connecting said setting knob with said movable blocking means so that said setting knob moves said movable blocking means into operative position in the path of said shutter blade when said setting knob is in time exposure setting position.

8. In a shutter blade actuating mechanism, a shutter blade, a manually turnable setting knob for setting the various longer and shorter exposure periods and the so-called time exposure for said shutter blade, a turnable winding drum mounted co-axially with said setting knob and operated at least during setting of said various shorter exposure periods by the same, a coiled spring for moving said shutter blade past the exposure aperture of a camera, said coiled spring being attached at its one end to said shutter blade and at its other end to said winding drum and wound up partly upon the same when said winding member is turned by said setting knob in such a manner as to stretch said coiled spring and increase the tension of the same when said exposure period has to be shortened during said various shorter exposure periods, delayed action means for reducing the speed of said shutter blade while during said longer exposure periods the shutter aperture on said shutter blade is in register with said exposure aperture of said camera, said delayed action means comprising a turnable toothed member, a braking mechanism adapted to engage the teeth of said toothed member and to limit the speed of turning of the latter, means operatively connecting said toothed member with said shutter blade while the same is moved by said coiled spring past said exposure aperture of said camera and said shutter aperture in said shutter blade is in register with said exposure aperture, and means operatively connected with said turnable setting knob for turning during setting of said longer exposure periods of said shutter blade said toothed member and thereby varying the number of teeth of said toothed member engaging during turning of the same said braking mechanism and varying also simultaneously the time of speed limitation of said toothed member, thus enabling variation of the length of time of speed reduction of said toothed member and of said shutter blade operatively connected with said toothed member during said longer exposure periods of said shutter blade, movable blocking means adapted to be moved into the path of said shutter blade so as to hold the same in operative position with said shutter aperture in register with said exposure aperture of said camera, means operatively connecting said setting knob with said movable blocking means so that said setting knob moves said movable blocking means into operative position in the path of said shutter blade when said setting knob is in time exposure setting position, means for releasing said shutter blade for operative exposing movement past said exposure aperture of said camera, and means operatively connected with said releasing means for moving said blocking means when the same have been moved by said setting knob into operative position in the said path of said shutter blade out of this path of said shutter blade after the latter has been held by said blocking means for the desired length of exposure time in operative position with said shutter aperture in register with said exposure aperture.

9. In a shutter blade actuating mechanism, a shutter blade, a manually turnable setting knob for setting the various longer and shorter exposure periods and the so-called time exposure for said shutter blade, a turnable winding drum mounted co-axially with said setting knob and operated at least during setting of said various shorter exposure periods by the same, a coiled spring for moving said shutter blade past the exposure aperture of a camera, said coiled spring being attached at its one end to said shutter blade and at its other end to said winding drum and wound up partly upon the same when said winding member is turned by said setting knob in such a manner as to stretch said coiled spring and increase the tension of the same when said exposure period has to be shortened during said various shorter exposure periods, delayed action means for reducing the speed of said shutter blade while during said longer exposure periods the shutter aperture on said shutter blade is in register with said exposure aperture of said camera, said delayed action means comprising a turnable toothed member, a supporting member supporting said toothed member freely turnably between two end positions, spring means urging said toothed member into one of said end positions, a braking mechanism adapted to engage the teeth of the toothed member and to limit the speed of turning of the latter, means operatively connecting said toothed member with said shutter blade while the same is moved by said shutter blade moving means past said exposure aperture of said camera and said shutter aperture in said shutter blade is in register with said exposure aperture of said camera, and means operatively connected with said turnable setting knob for turning during setting of said longer exposure periods of said shutter blade said supporting member and said toothed member carried by the same and thereby varying the number of teeth of said toothed member engaging during turning of the same said braking mechanism and varying also simultaneously the time of speed limitation of said toothed member, thus enabling variation of the length of time of speed reduction of said toothed member and of said shutter blade operatively connected with said toothed member during said longer exposure periods of said shutter blade, movable blocking means adapted to be moved into the path of said shutter blade so as to hold the same in operative position with said shutter aperture in register with said exposure aperture of said camera, and means operatively connecting said setting knob with said movable blocking means so that said setting knob moves said movable blocking means into operative position in the path of said shutter blade when said setting knob is in time exposure setting position.

10. In a shutter blade actuating mechanism, a shutter blade, a manually turnable setting knob for setting the various longer and shorter exposure periods and the so-called time exposure for said shutter blade, a turnable winding drum mounted co-axially with said setting knob and operated at least during setting of said various shorter exposure periods by the same, a coiled spring for moving said shutter blade past the exposure aperture of a camera, said coiled spring being attached at its one end to said shutter blade and at its other end to said winding drum and wound up partly upon the same when said winding member is turned by said setting knob in such a manner as to stretch said coiled spring and increase the tension of the same when said exposure period has to be shortened during said various shorter exposure periods, delayed action means for reducing the speed of said shutter blade while during said longer exposure periods the shutter aperture on said shutter blade is in register with said exposure aperture of said camera, said delayed action means comprising a turnable toothed member, a supporting member supporting said toothed member freely turnably between two end positions, spring means urging said toothed member into one of said end positions, a braking mechanism adapted to engage the teeth of the toothed member and to limit the speed of turning of the latter, means operatively connecting said toothed member with said shutter blade while the same is moved by said shutter blade moving means past said exposure aperture of said camera and said shutter aperture in said shutter blade is in register with said exposure aperture of said camera, and means operatively connected with said turnable setting knob for turning during setting of said longer exposure periods of said shutter blade said supporting member and said toothed member carried by the same and thereby varying the number of teeth of said toothed member engaging during turning of the same said braking mechanism and varying also simultaneously the time of speed limitation of said toothed member, thus enabling variation of the length of time of speed reduction of said toothed member and of said shutter blade operatively connected with said toothed member during said longer exposure periods of said shutter blade, movable blocking means adapted to be moved into the path of said shutter blade so as to hold the same in operative position with said shutter aperture in register with said exposure aperture of said camera, means operatively connecting said setting knob with said movable blocking means so that said setting knob moves said movable blocking means into operative position in the path of said shutter blade when said setting knob is in time exposure setting position, means for releasing said shutter blade for operative exposing movement past said exposure aperture of said camera, and means operatively connected with said releasing means for moving said blocking means when the same have been moved by said setting knob into operative position in the said path of said shutter blade out of this path of said shutter blade after the latter has been held by said blocking means for the desired length of exposure time in operative position with said shutter aperture in register with said exposure aperture.

11. In a shutter blade actuating mechanism of the type described, a shutter blade, a manually operable setting member for setting the various longer and shorter exposure periods and the so-called time exposure for said shutter blade, a turnable winding member operated at least during setting of said various shorter exposure periods by said setting member, a coiled spring for moving said shutter blade past the exposure aperture of a camera, said coiled spring being attached at its one end to said shutter blade and at its other end to said winding member and wound up partly upon the same when said winding member is turned by said setting member in such a manner as to stretch said coiled spring at least during said various shorter exposure periods by stretching the same when said exposure period has to be shortened, delayed action means for reducing the speed of said shutter blade while the shutter aperture in said shutter blade is in register with said exposure aperture of said camera, said delayed action means comprising a turnable toothed member, a braking mechanism adapted to engage the teeth of said toothed member and to limit the speed of turning of the latter, means operatively connecting said toothed member with said shutter blade while the same is moved by said coiled spring past said exposure aperture of said camera and said shutter aperture in said shutter blade is in register with said exposure aperture, and means operated by said setting member for turning said toothed member during setting of said various longer exposure periods and thereby varying the number of teeth of said toothed member engaging during turning of the same said braking mechanism and varying also simultaneously the time of speed limitation of said toothed member, thus enabling variation of the length of time of speed reduction of said toothed member and of said shutter blade operatively connected with said toothed member during said various longer exposure periods of said shutter blade, blocking means adapted to be moved into the path of said shutter blade so as to hold the same in operative position with said shutter aperture in register with said exposure aperture of said camera, a supporting member carrying said blocking means and movably secured to said camera, and means operatively connecting said setting member with said movable supporting member so that said setting member moves said supporting member together with said blocking means into operative position in the path of said shutter blade when said setting member is in time exposure setting position.

12. In a shutter blade actuating mechanism of the type described, a shutter blade, a manually operable setting member for setting the various longer and shorter exposure periods and the so-called time exposure for said shutter blade, a turnable winding member operated at least during setting of said various shorter exposure periods by said setting member, a coiled spring for moving said shutter blade past the exposure aperture of a camera, said coiled spring being attached at its one end to said shutter blade and at its other end to said winding member and wound up partly upon the same when said winding member is turned by said setting member in such a manner as to stretch said coiled spring at least during said various shorter exposure periods by stretching the same when said exposure period has to be shortened, delayed action means for reducing the speed of said shutter blade while the shutter aperture in said shutter blade is in register with said exposure aperture of said camera, said delayed action means comprising a turnable toothed member, a braking mechanism adapted to engage the teeth of said toothed member and to limit the speed of turning of the latter, means operatively connecting said toothed member with said shutter blade while the same is moved by said coiled spring past said exposure aperture of said camera and said shutter aperture in said shutter blade is in register with said exposure aperture, and means operated by said setting member for turning said toothed member during setting of said various longer exposure periods and thereby varying the number of teeth of said toothed member engaging during turning of the same said braking mechanism and varying also simultaneously the time of speed limitation of said toothed member, thus enabling variation of the length of time of speed reduction of said toothed member and of said shutter blade operatively connected with said toothed member during said various longer exposure periods of said shutter blade, blocking means adapted to be moved into the path of said shutter blade so as to hold the same in operative position with said shutter aperture in register with said exposure aperture of said camera, a supporting member carrying said blocking means and movably secured to said camera, means operatively connecting said setting member with said movable supporting member so that said setting member moves said supporting member together with said blocking means into operative position in the path of said shutter blade when said setting member is in time exposure setting position, means for releasing said shutter blade for operative exposing movement past said exposure aperture of said camera, and means operatively connected with said releasing means for moving said blocking means movably carried by said supporting means after the same have been moved by said setting member into operative position out of the path of said shutter blade after the latter has been held by said blocking means for the desired length of exposure time in operative position with said shutter aperture in register with said exposure aperture.

13. In a shutter blade actuating mechanism, a shutter blade, a manually turnable setting knob for setting the various longer and shorter exposure times for said shutter blade, a turnable winding drum secured co-axially to said setting knob and operated by the same, a coiled spring for moving said shutter blade past the exposure aperture of a camera, said coiled spring being attached at its one end to said shutter blade and at its other end to said winding drum and wound up partly upon the same when said winding member is turned by said setting knob in such a manner as to stretch said coiled spring and increase the tension of the same when said exposure time has to be shortened, delayed action means for reducing during said longer exposure times the speed of said shutter blade while the same is moved by said coiled spring past said exposure aperture, means for varying the delaying action of said delayed action means as necessary for obtaining the required longer exposure time, means for cooperatively connecting said means for varying the delaying action with said setting knob so as to enable operation of said varying means and said delayed action means influenced by the latter in such a manner as to obtain during said longer exposure times the required speed reducing action of said delayed action means, movable blocking means adapted to be moved into the path of said shutter blade so as to hold the same in operative position with said shutter aperture in register with said exposure aperture of said camera, and means operatively connecting said setting knob with said movable blocking means so that said setting knob moves said movable blocking means into operative position in the path of said shutter blade when said setting knob is in time exposure setting position.

14. In a shutter blade actuating mechanism, a shutter blade, a manually turnable setting knob for setting the various longer and shorter exposure times for said shutter blade, a turnable winding drum secured co-axially to said setting knob and operated by the same, a coiled spring for moving said shutter blade past the exposure aperture of a camera, said coiled spring being attached at its one end to said shutter blade and at its other end to said winding drum and wound up partly upon the same when said winding member is turned by said setting knob in such a manner as to stretch said coiled spring and increase the tension of the same when said exposure time has to be shortened, delayed action means for reducing during said longer exposure times the speed of said shutter blade while the same is moved by said coiled spring past said exposure aperture, means for varying the delaying action of said delayed action means as necessary for obtaining the required longer exposure time, means for cooperatively connecting said means for varying the delaying action with said setting knob so as to enable operation of said varying means and said delayed action means influenced by the latter in such a manner as to obtain during said longer exposure times the required speed reducing action of said delayed action means, movable blocking means adapted to be moved into the path of said shutter blade so as to hold the same in operative position with said shutter aperture in register with said exposure aperture of said camera, means operatively connecting said setting knob with said movable blocking means so that said setting knob moves said movable blocking means into operative position in the path of said shutter blade when said setting knob is in time exposure setting position, means for releasing said shutter blade for operative exposing movement past said exposure aperture of said camera, and means operatively connected with said releasing means for moving said blocking means when the same have been moved by said setting knob into operative position in the said path of said shutter blade out of this path of said shutter blade after the latter has been held by said blocking means for the desired length of exposure time in operative position with said shutter aperture in register with said exposure aperture.

JACQUES BOLSEY.